(12) United States Patent
White et al.

(10) Patent No.: US 8,166,217 B2
(45) Date of Patent: Apr. 24, 2012

(54) SYSTEM AND METHOD FOR READING AND WRITING DATA USING STORAGE CONTROLLERS

(75) Inventors: Theodore C. White, Rancho Santa Margarita, CA (US); William W. Dennin, Mission Viejo, CA (US); Angel G. Perozo, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 731 days.

(21) Appl. No.: 10/878,803

(22) Filed: Jun. 28, 2004

(65) Prior Publication Data

US 2005/0289261 A1  Dec. 29, 2005

(51) Int. Cl.
| | |
|---|---|
| G06F 3/00 | (2006.01) |
| G06F 13/12 | (2006.01) |
| G06F 13/14 | (2006.01) |
| H03M 1/22 | (2006.01) |
| H03M 7/00 | (2006.01) |
| H03M 9/00 | (2006.01) |
| H04L 12/50 | (2006.01) |

(52) U.S. Cl. ............... 710/66; 710/1; 710/5; 710/20; 710/30; 710/52; 710/65; 710/71; 710/74; 710/305; 341/4; 341/50; 341/95; 341/100; 341/101; 370/357

(58) Field of Classification Search ............... None
See application file for complete search history.

(56) References Cited

U.S. PATENT DOCUMENTS

| | | | |
|---|---|---|---|
| 3,800,281 A | 3/1974 | Devore et al. | |
| 3,988,716 A | 10/1976 | Fletcher | |
| 4,001,883 A | 1/1977 | Strout et al. | |
| 4,016,368 A | 4/1977 | Apple, Jr. | |
| 4,050,097 A | 9/1977 | Miu | |
| 4,080,649 A | 3/1978 | Calle | |
| 4,156,867 A | 5/1979 | Bench et al. | |
| 4,225,960 A | 9/1980 | Masters | |
| 4,275,457 A | 6/1981 | Leighou | |
| 4,390,969 A | 6/1983 | Hayes | |
| 4,451,898 A | 5/1984 | Palermo | |
| 4,486,750 A | 12/1984 | Aoki | |

(Continued)

FOREIGN PATENT DOCUMENTS

EP  0 0383 437 A2 *  2/1990

(Continued)

OTHER PUBLICATIONS

PCT International Search Report, Doc. No. PCT/US00/15084, Dated Nov. 15, 2000.

(Continued)

*Primary Examiner* — Tariq Hafiz
*Assistant Examiner* — Henry Yu

(57) ABSTRACT

A controller for interfacing a host and storage device is provided. The controller includes a channel that can receive data from the storage device in a first format and store the data in an intermediate buffer memory in a second format. The channel includes conversion logic that converts data from the first format to the second format and from the second format to the first format depending upon whether data is being read or written from the buffer memory. The conversion logic uses a shuttle register and shuttle counter for aligning data that is being transferred between the storage device and the buffer memory by appropriately concatenating data to meet the first and second format requirements. The first format is based on 10-bit symbols and the second format is based on 8-bits.

20 Claims, 15 Drawing Sheets

U.S. PATENT DOCUMENTS

| | | |
|---|---|---|
| 4,500,926 A | 2/1985 | Yoshimaru et al. |
| 4,517,552 A * | 5/1985 | Shirota et al. .................. 341/58 |
| 4,587,609 A | 5/1986 | Boudreau et al. |
| 4,603,382 A | 7/1986 | Cole |
| 4,625,321 A | 11/1986 | Pechar |
| 4,667,286 A | 5/1987 | Young |
| 4,719,523 A * | 1/1988 | Kutaragi ........................ 360/51 |
| 4,750,149 A * | 6/1988 | Miller ............................ 710/71 |
| 4,777,635 A | 10/1988 | Glover |
| 4,805,046 A | 2/1989 | Kuroki et al. |
| 4,807,116 A | 2/1989 | Katzman et al. |
| 4,807,253 A | 2/1989 | Hagenauer et al. |
| 4,809,091 A | 2/1989 | Miyazawa et al. |
| 4,811,282 A | 3/1989 | Masina |
| 4,812,769 A | 3/1989 | Agoston |
| 4,860,333 A | 8/1989 | Bitzinger et al. |
| 4,866,601 A * | 9/1989 | DuLac et al. .................. 711/111 |
| 4,866,606 A | 9/1989 | Kopetz |
| 4,881,232 A | 11/1989 | Sako et al. |
| 4,920,535 A | 4/1990 | Watanabe et al. |
| 4,947,410 A * | 8/1990 | Lippmann et al. ............... 377/26 |
| 4,949,342 A | 8/1990 | Shimbo et al. |
| 4,970,418 A | 11/1990 | Masterson |
| 4,972,417 A | 11/1990 | Sako et al. |
| 4,975,915 A | 12/1990 | Sako et al. |
| 4,989,190 A | 1/1991 | Kuroe et al. |
| 5,014,186 A | 5/1991 | Chisholm |
| 5,023,612 A | 6/1991 | Liu |
| 5,027,357 A | 6/1991 | Yu et al. |
| 5,050,013 A | 9/1991 | Holsinger |
| 5,051,998 A | 9/1991 | Murai et al. |
| 5,068,755 A | 11/1991 | Hamilton et al. |
| 5,068,857 A | 11/1991 | Yoshida |
| 5,072,420 A | 12/1991 | Conley |
| 5,088,093 A | 2/1992 | Storch et al. |
| 5,109,500 A | 4/1992 | Iseki |
| 5,117,442 A | 5/1992 | Hall |
| 5,127,098 A | 6/1992 | Rosenthal |
| 5,133,062 A | 7/1992 | Joshi et al. |
| 5,136,592 A | 8/1992 | Weng |
| 5,146,585 A | 9/1992 | Smith, III |
| 5,157,669 A | 10/1992 | Yu et al. |
| 5,162,954 A | 11/1992 | Miller et al. |
| 5,193,197 A | 3/1993 | Thacker |
| 5,204,859 A | 4/1993 | Paesler et al. |
| 5,218,564 A | 6/1993 | Covey |
| 5,220,569 A | 6/1993 | Hartness |
| 5,237,593 A | 8/1993 | Fisher et al. |
| 5,243,471 A | 9/1993 | Shinn |
| 5,249,271 A | 9/1993 | Hopkinson |
| 5,257,143 A | 10/1993 | Zangenehpur |
| 5,261,081 A | 11/1993 | White |
| 5,271,018 A | 12/1993 | Chan |
| 5,274,509 A | 12/1993 | Buch |
| 5,276,564 A | 1/1994 | Hessing et al. |
| 5,276,662 A | 1/1994 | Shaver, Jr. et al. |
| 5,276,807 A | 1/1994 | Kodama |
| 5,280,488 A | 1/1994 | Glover et al. |
| 5,285,327 A | 2/1994 | Hetzler |
| 5,285,451 A | 2/1994 | Henson |
| 5,301,333 A | 4/1994 | Lee |
| 5,307,216 A | 4/1994 | Cook et al. |
| 5,315,708 A | 5/1994 | Eidler |
| 5,339,443 A | 8/1994 | Lockwood |
| 5,361,266 A | 11/1994 | Kodama et al. |
| 5,361,267 A | 11/1994 | Godiwala |
| 5,408,644 A | 4/1995 | Schneider |
| 5,420,984 A | 5/1995 | Good et al. |
| 5,428,627 A * | 6/1995 | Gupta ............................ 714/771 |
| 5,440,751 A | 8/1995 | Santeler |
| 5,465,343 A | 11/1995 | Henson |
| 5,487,170 A | 1/1996 | Bass |
| 5,488,688 A | 1/1996 | Gonzales |
| 5,491,701 A | 2/1996 | Zook |
| 5,500,848 A | 3/1996 | Best |
| 5,506,989 A | 4/1996 | Boldt |
| 5,507,005 A * | 4/1996 | Kojima et al. .................. 710/52 |
| 5,519,837 A | 5/1996 | Tran |
| 5,523,903 A | 6/1996 | Hetzler |
| 5,541,908 A * | 7/1996 | Hsu et al. ...................... 720/662 |
| 5,544,180 A | 8/1996 | Gupta |
| 5,544,346 A | 8/1996 | Amini |
| 5,546,545 A | 8/1996 | Rich |
| 5,546,548 A | 8/1996 | Chen |
| 5,563,896 A | 10/1996 | Nakagushi |
| 5,572,148 A | 11/1996 | Lytle |
| 5,574,867 A | 11/1996 | Khaira |
| 5,581,715 A | 12/1996 | Verinsky et al. |
| 5,583,999 A | 12/1996 | Sato |
| 5,592,404 A | 1/1997 | Zook |
| 5,600,662 A | 2/1997 | Zook |
| 5,602,857 A | 2/1997 | Zook |
| 5,615,190 A | 3/1997 | Best |
| 5,623,672 A | 4/1997 | Popat |
| 5,627,695 A | 5/1997 | Prinis |
| 5,629,949 A | 5/1997 | Zook |
| 5,640,602 A | 6/1997 | Takase |
| 5,649,230 A | 7/1997 | Lentz |
| 5,664,121 A | 9/1997 | Cerauskis |
| 5,689,656 A | 11/1997 | Baden |
| 5,691,994 A | 11/1997 | Acosta |
| 5,692,135 A | 11/1997 | Alvarez |
| 5,692,165 A | 11/1997 | Jeddeloh |
| 5,719,516 A | 2/1998 | Sharpe-Geisler |
| 5,729,718 A | 3/1998 | Au |
| 5,740,466 A | 4/1998 | Geldman |
| 5,745,793 A | 4/1998 | Atsatt |
| 5,754,759 A | 5/1998 | Clarke |
| 5,758,188 A | 5/1998 | Appelbaum |
| 5,784,569 A | 7/1998 | Miller |
| 5,794,073 A | 8/1998 | Ramakrishnan |
| 5,801,998 A | 9/1998 | Choi |
| 5,818,886 A | 10/1998 | Castle |
| 5,822,142 A | 10/1998 | Hicken |
| 5,831,922 A | 11/1998 | Choi |
| 5,835,930 A | 11/1998 | Dobbek |
| 5,841,722 A | 11/1998 | Willenz |
| 5,844,844 A | 12/1998 | Bauer |
| 5,850,422 A | 12/1998 | Chen |
| 5,854,918 A | 12/1998 | Baxter |
| 5,864,309 A * | 1/1999 | Hung ............................ 341/61 |
| 5,887,199 A * | 3/1999 | Ofer et al. ...................... 710/65 |
| 5,890,207 A | 3/1999 | Sne |
| 5,890,210 A | 3/1999 | Ishii |
| 5,907,717 A | 5/1999 | Ellis |
| 5,912,906 A | 6/1999 | Wu et al. |
| 5,922,062 A * | 7/1999 | Evoy ............................ 710/305 |
| 5,925,135 A | 7/1999 | Trieu |
| 5,937,435 A | 8/1999 | Dobbek |
| 5,950,223 A | 9/1999 | Chiang |
| 5,968,180 A | 10/1999 | Baco |
| 5,983,293 A | 11/1999 | Murakami |
| 5,991,911 A | 11/1999 | Zook |
| 6,029,226 A | 2/2000 | Ellis |
| 6,029,250 A | 2/2000 | Keeth |
| 6,041,417 A | 3/2000 | Hammond |
| 6,065,053 A | 5/2000 | Nouri |
| 6,067,206 A | 5/2000 | Hull et al. |
| 6,070,200 A | 5/2000 | Gates |
| 6,076,120 A * | 6/2000 | Hatayama ...................... 710/20 |
| 6,078,447 A | 6/2000 | Sim |
| 6,081,849 A | 6/2000 | Born |
| 6,092,231 A | 7/2000 | Sze |
| 6,094,320 A | 7/2000 | Ahn |
| 6,124,994 A | 9/2000 | Malone, Sr. |
| 6,127,948 A * | 10/2000 | Hillis et al. ...................... 341/4 |
| 6,134,063 A | 10/2000 | Weston Lewis |
| 6,157,984 A | 12/2000 | Fisher |
| 6,169,501 B1 * | 1/2001 | Ryan ............................ 341/101 |
| 6,178,486 B1 | 1/2001 | Gill |
| 6,184,808 B1 * | 2/2001 | Nakamura ...................... 341/95 |
| 6,192,499 B1 | 2/2001 | Yang |
| 6,201,655 B1 | 3/2001 | Watanabe |
| 6,223,303 B1 | 4/2001 | Billings |
| 6,237,053 B1 * | 5/2001 | Herrod et al. ................... 710/65 |
| 6,279,089 B1 | 8/2001 | Schibilla |
| 6,297,926 B1 | 10/2001 | Ahn |

| | | | |
|---|---|---|---|
| 6,311,239 B1* | 10/2001 | Matthews | 710/66 |
| 6,330,626 B1* | 12/2001 | Dennin et al. | 710/52 |
| 6,381,659 B2 | 4/2002 | Proch | |
| 6,401,149 B1 | 6/2002 | Dennin | |
| 6,421,795 B2* | 7/2002 | Yamashita | 714/45 |
| 6,470,461 B1 | 10/2002 | Pinvidic | |
| 6,487,631 B2 | 11/2002 | Dickinson | |
| 6,490,635 B1 | 12/2002 | Holmes | |
| 6,516,385 B1* | 2/2003 | Satoyama et al. | 711/112 |
| 6,529,971 B1* | 3/2003 | Thiesfeld | 710/53 |
| 6,530,000 B1 | 3/2003 | Krantz et al. | |
| 6,574,676 B1 | 6/2003 | Megiddo | |
| 6,631,131 B1* | 10/2003 | Sonnier et al. | 370/357 |
| 6,662,334 B1 | 12/2003 | Stenfort | |
| 6,826,650 B1 | 11/2004 | Krantz | |
| 6,961,832 B2* | 11/2005 | Satoyama et al. | 711/162 |
| 7,007,114 B1* | 2/2006 | White et al. | 710/52 |
| 7,047,388 B2* | 5/2006 | Kaneko | 711/170 |
| 7,191,431 B2* | 3/2007 | Brown et al. | 717/136 |
| 7,581,041 B1* | 8/2009 | Whitby-Strevens et al. | 710/52 |
| 7,752,202 B2* | 7/2010 | Kobori et al. | 707/736 |
| 2001/0044873 A1 | 11/2001 | Wilson | |
| 2002/0087746 A1* | 7/2002 | Ludtke et al. | 710/1 |
| 2002/0110157 A1* | 8/2002 | Jorgenson et al. | 370/537 |
| 2003/0037225 A1 | 2/2003 | Deng et al. | |
| 2004/0024930 A1* | 2/2004 | Nakayama et al. | 710/5 |
| 2004/0088456 A1* | 5/2004 | Zhang | 710/74 |
| 2005/0007811 A1* | 1/2005 | Hyoudou | 365/145 |
| 2006/0167936 A1* | 7/2006 | Okauchi et al. | 707/104.1 |

FOREIGN PATENT DOCUMENTS

| | | |
|---|---|---|
| EP | 0528273 | 2/1993 |
| EP | 0622726 | 11/1994 |
| EP | 0718827 | 12/1995 |
| GB | 2285166 | 6/1995 |
| JP | 62-125965 | 5/1987 |
| JP | 63-146198 | 6/1988 |
| JP | 03183067 | 11/1989 |
| WO | 98/14861 | 4/1998 |

OTHER PUBLICATIONS

Blathut R. Digital Transmission of Information (Dec. 4, 1990).
Hwang, Kai and Briggs, Faye A., "Computer Architecture and Parallel Processing" pp. 156-164.
Zeidman, Bob, "Interleaving DRAMS for faster access", System Design ASIC & EDA, pp. 24-34 (Nov. 1993).
PM bland et. al. Shared Storage Bus Circuitry, IBM Technical Disclosure Bulletin, vol. 25, No. 4, Sep. 1982, pp. 2223-2224.
PCT search report for PCT/US00/07780 mailed Oct. 2, 2000.
PCT Search Report Mailed Jan. 21, 2003.

* cited by examiner

| In_Datain | In_Shuttle | Word Sel | B_Wr | sh7 | sh6 | sh5 | sh4 | sh3 | sh2 | sh1 | sh0 |
|---|---|---|---|---|---|---|---|---|---|---|---|
| 10 | 0 | Low | 1 | | | | | | | di9 | di8 |
| 10 | 2 | Low | 1 | | | | | di9 | di8 | di7 | di6 |
| 10 | 4 | Low | 1 | | | di9 | di8 | di7 | di6 | di5 | di4 |
| 10 | 6 | Low | 1 | di9 | di8 | di7 | di6 | di5 | di4 | di3 | di2 |
| 10 | 8 | OVERFLOW | 1 | - | - | - | - | - | - | - | - |
| 8 | 0 | Low | 1 | di7 | di6 | di5 | di4 | di3 | di2 | di1 | di0 |
| 8 | 2 | Low | 1 | | | | | | | di7 | di6 |
| 8 | 4 | Low | 1 | | | | | di7 | di6 | di5 | di4 |
| 8 | 6 | Low | 1 | | | di7 | di6 | di5 | di4 | di3 | di2 |
| 8 | 8 | Low | 1 | di7 | di6 | di5 | di4 | di3 | di2 | di1 | di0 |
| 6 | 0 | Low | 1 | | | | di5 | di4 | di3 | di2 | di1 | di0 |
| 6 | 2 | Low | 1 | | | | | | | | |
| 6 | 4 | Low | 1 | | | | | | | di5 | di4 |
| 6 | 6 | Low | 1 | | | | | di5 | di4 | di3 | di2 |
| 6 | 8 | Low | 1 | | | di5 | di4 | di3 | di2 | di1 | di0 |
| 4 | 0 | Low | 1 | | | | | di3 | di2 | di1 | di0 |
| 4 | 2 | Low | 1 | | | di3 | di2 | di1 | di0 | sh1 | sh0 |
| 4 | 4 | Low | 1 | | | | | | | | |
| 4 | 6 | Low | 1 | | | | | | | di3 | di2 |
| 4 | 8 | Low | 1 | | | | | di3 | di2 | di1 | di0 |
| 2 | 0 | Low | 1 | | | | | | | di1 | di0 |
| 2 | 2 | Low | 1 | | | | | di1 | di0 | sh1 | sh0 |
| 2 | 4 | Low | 1 | | | di1 | di0 | sh3 | sh2 | sh1 | sh0 |
| 2 | 6 | Low | 1 | | | | | | | | |
| 2 | 8 | Low | 1 | | | | | | | di1 | di0 |

Write Operation

FIGURE 3B-(i)

| do9 | do8 | do7 | do6 | do5 | do4 | d03 | do2 | do1 | do0 |
|---|---|---|---|---|---|---|---|---|---|
| Not used | Not used | di7 | di6 | di5 | di4 | di3 | di2 | di1 | di0 |
| Not used | Not used | di5 | di4 | di3 | di2 | di1 | di0 | sh1 | sh0 |
| Not used | Not used | di3 | di2 | di1 | di0 | sh3 | sh2 | sh1 | sh0 |
| Not used | Not used | di1 | di0 | sh5 | sh4 | sh3 | sh2 | sh1 | sh0 |
| Not used | Not used | - | - | - | - | - | - | - | - |
| Not used | Not used | | | | | | | | |
| Not used | Not used | di5 | di4 | di3 | di2 | di1 | di0 | sh1 | sh0 |
| Not used | Not used | di3 | di2 | di1 | di0 | sh3 | sh2 | sh1 | sh0 |
| Not used | Not used | di1 | di0 | sh5 | sh4 | sh3 | sh2 | sh1 | sh0 |
| Not used | Not used | sh7 | sh6 | sh5 | sh4 | sh3 | sh2 | sh1 | sh0 |
| Not used | Not used | | | | | | | | |
| Not used | Not used | di5 | di4 | di3 | di2 | di1 | di0 | sh1 | sh0 |
| Not used | Not used | di3 | di2 | di1 | di0 | sh3 | sh2 | sh1 | sh0 |
| Not used | Not used | di1 | di0 | sh5 | sh4 | sh3 | sh2 | sh1 | sh0 |
| Not used | Not used | sh7 | sh6 | sh5 | sh4 | sh3 | sh2 | sh1 | sh0 |
| Not used | Not used | | | | | | | | |
| Not used | Not used | | | | | | | | |
| Not used | Not used | di3 | di2 | di1 | di0 | sh3 | sh2 | sh1 | sh0 |
| Not used | Not used | di1 | di0 | sh5 | sh4 | sh3 | sh2 | sh1 | sh0 |
| Not used | Not used | sh7 | sh6 | sh5 | sh4 | sh3 | sh2 | sh1 | sh0 |
| Not used | Not used | | | | | | | | |
| Not used | Not used | | | | | | | | |
| Not used | Not used | | | | | | | | |
| Not used | Not used | di1 | di0 | sh5 | sh4 | sh3 | sh2 | sh1 | sh0 |
| Not used | Not used | sh7 | sh6 | sh5 | sh4 | sh3 | sh2 | sh1 | sh0 |

FIGURE 3B-(ii)

| In_Datain | In_Shuttle | Word Sel | B_Wr | sh7 | sh6 | sh5 | sh4 | sh3 | sh2 | sh1 | sh0 |
|---|---|---|---|---|---|---|---|---|---|---|---|
| 8 | 0 | Low | 0 | di7 | di6 | di5 | di4 | di3 | di2 | di1 | di0 |
| 8 | 2 | Low | 0 | | | | | | | | |
| 8 | 4 | Low | 0 | | | | | | | di7 | di6 |
| 8 | 6 | Low | 0 | | | | | | di7 | di6 | di5 | di4 |
| 8 | 8 | Low | 0 | | | di7 | di6 | di5 | di4 | di3 | di2 |
| 4 | 0 | Low | 0 | | | | | di3 | di2 | di1 | di0 |
| 4 | 2 | Low | 0 | | | | di3 | di2 | di1 | di0 | sh1 | sh0 |
| 4 | 4 | Low | 0 | di3 | di2 | di1 | di0 | sh3 | sh2 | sh1 | sh0 |
| 4 | 6 | Low | 0 | | | | | | | | |
| 4 | 8 | Low | 0 | | | | | | | di3 | di2 |
| 4 | 0 | High | 0 | | | | di7 | di6 | di5 | di4 |
| 4 | 2 | High | 0 | | | di7 | di6 | di5 | di4 | sh1 | sh0 |
| 4 | 4 | High | 0 | di7 | di6 | di5 | di4 | sh3 | sh2 | sh1 | sh0 |
| 4 | 6 | High | 0 | | | | | | | | |
| 4 | 8 | High | 0 | | | | | | | di7 | di6 |

Read Operation

FIGURE 3B-(iii)

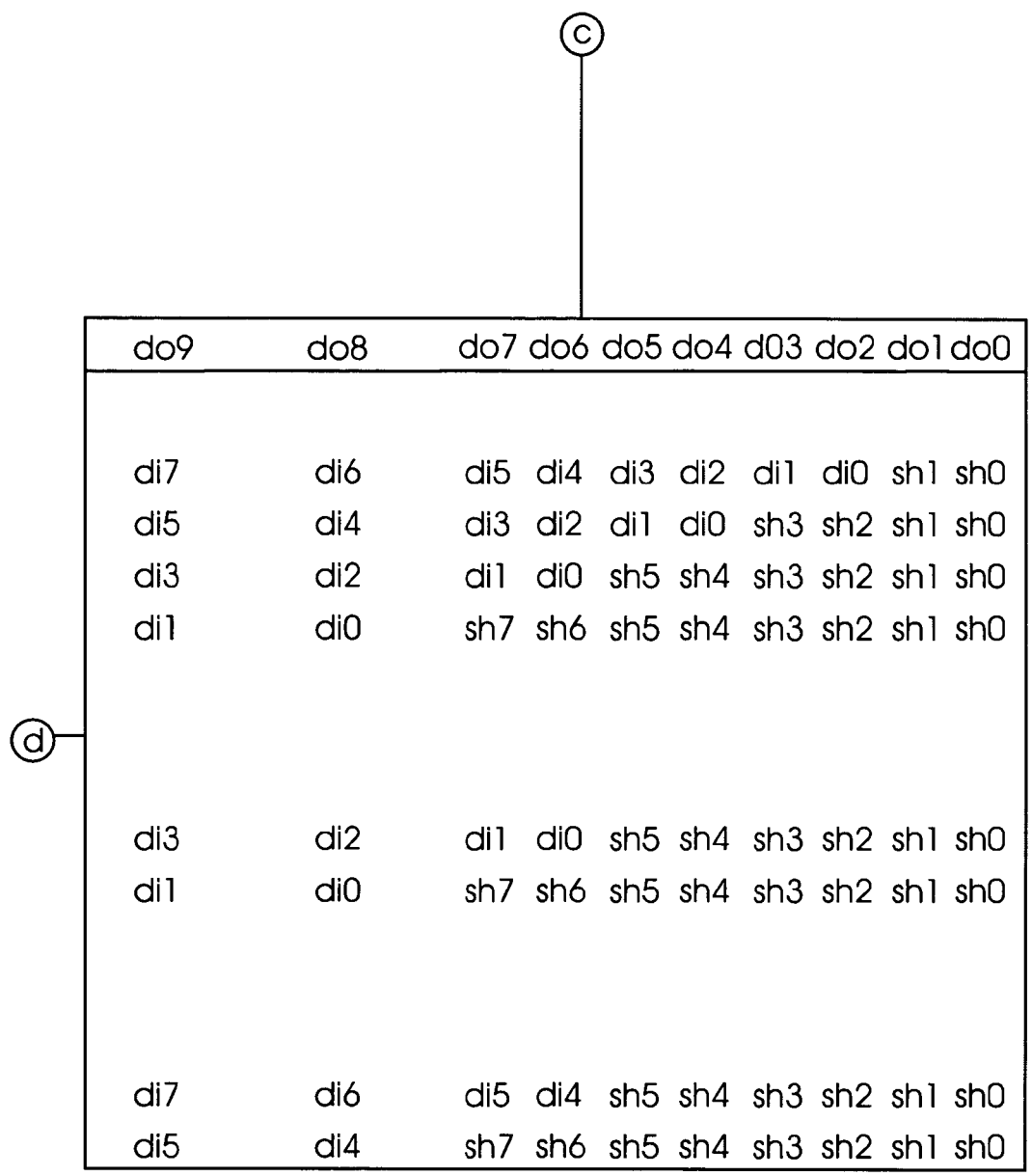
FIGURE 3B-(iv)

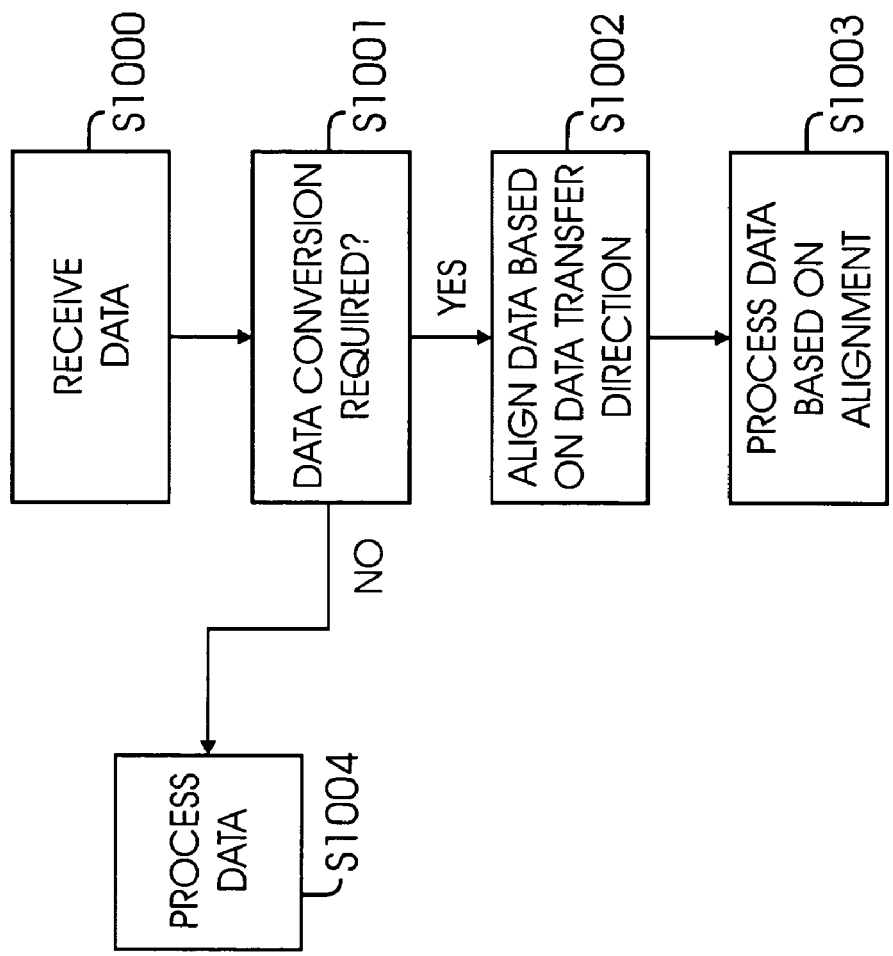

SYSTEM AND METHOD FOR READING AND WRITING DATA USING STORAGE CONTROLLERS

BACKGROUND OF THE INVENTION

1. Field of the Invention

The present invention relates generally to storage device controllers, and more particularly, to reading and writing data using a buffer controller.

2. Background

Conventional computer systems typically include several functional components. These components may include a central processing unit (CPU), main memory, input/output ("I/O") devices, and streaming storage devices (for example, tape drives) (referred to herein as "storage device"). In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

The storage device is coupled to the host system via a controller that handles complex details of interfacing the storage devices to the host system. Communications between the host system and the controller is usually provided using one of a variety of standard I/O bus interfaces.

Typically, when data is read from a storage device, a host system sends a read command to the controller, which stores the read command into the buffer memory. Data is read from the device and stored in the buffer memory.

Previously data from a storage device was sent to the controller in 8-bit sizes (i.e. byte oriented where 1 byte is equal to 8 bits) and the controllers were designed to operate with 8-bit format. However, changes by some storage device manufacturers, for example, hard disk manufacturers, will now provide data in 10-bit format (i.e., symbol oriented where one symbol is equal to 10 bits). Other storage device manufacturers, for example, tape drives manufacturers, will continue to provide data in 8-bit format. Due to the disparity in data formats, conventional controllers fail to efficiently handle 8-bit to 10 bits and 10 bit to 8 bit conversion.

Therefore, there is a need for a controller that can efficiently handle data transfer where data may enter the controller in more than one format.

SUMMARY OF THE INVENTION

A controller for interfacing between a host and storage device is provided, according to one aspect of the present invention. The controller includes a channel that can receive data from the storage device in a first format and store the data in an intermediate buffer memory in a second format. The channel includes conversion logic that converts data from the first format to the second format and from the second format to the first format depending upon whether data is being read or written from the buffer memory.

The conversion logic uses a shuttle register and shuttle counter for aligning data that is being transferred between the storage device and the buffer memory by appropriately concatenating data to meet the first and second format requirements. The first format is based on 10-bit symbols and the second format is based on 8-bits.

In yet another aspect, a system for transferring data between a host system and a storage device is provided. The system includes, a controller that is coupled to a buffer memory and includes a channel that can receive data from the storage device in a first format and store the data in the buffer memory in a second format and the channel includes the conversion logic that converts data from the first format to the second format and from the second format to the first format depending upon whether data is being read or written from the buffer memory.

In yet another aspect of the present invention, a method for transferring data between a storage device and a host system via a controller that is coupled to a buffer memory is provided. The method includes determining if any conversion is required based on whether a storage device and the buffer memory support different data format; enabling data format conversion, if required; and converting data format conversion based on whether data is being read or written to the buffer memory.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 3B(i)-(iv) (referred to as FIG. 3B) shows a table that aligns data into a shuttle register, according to one aspect of the present invention;

FIG. 10 shows a process flow diagram for data conversion and alignment, according to one aspect of the present invention.

DETAILED DESCRIPTION OF THE PREFERRED EMBODIMENTS

Controller Overview:

To facilitate an understanding of the preferred embodiment, the general architecture and operation of a controller will initially be described. The specific architecture and operation of the preferred embodiment will then be described with reference to the general architecture.

Figure 1A:
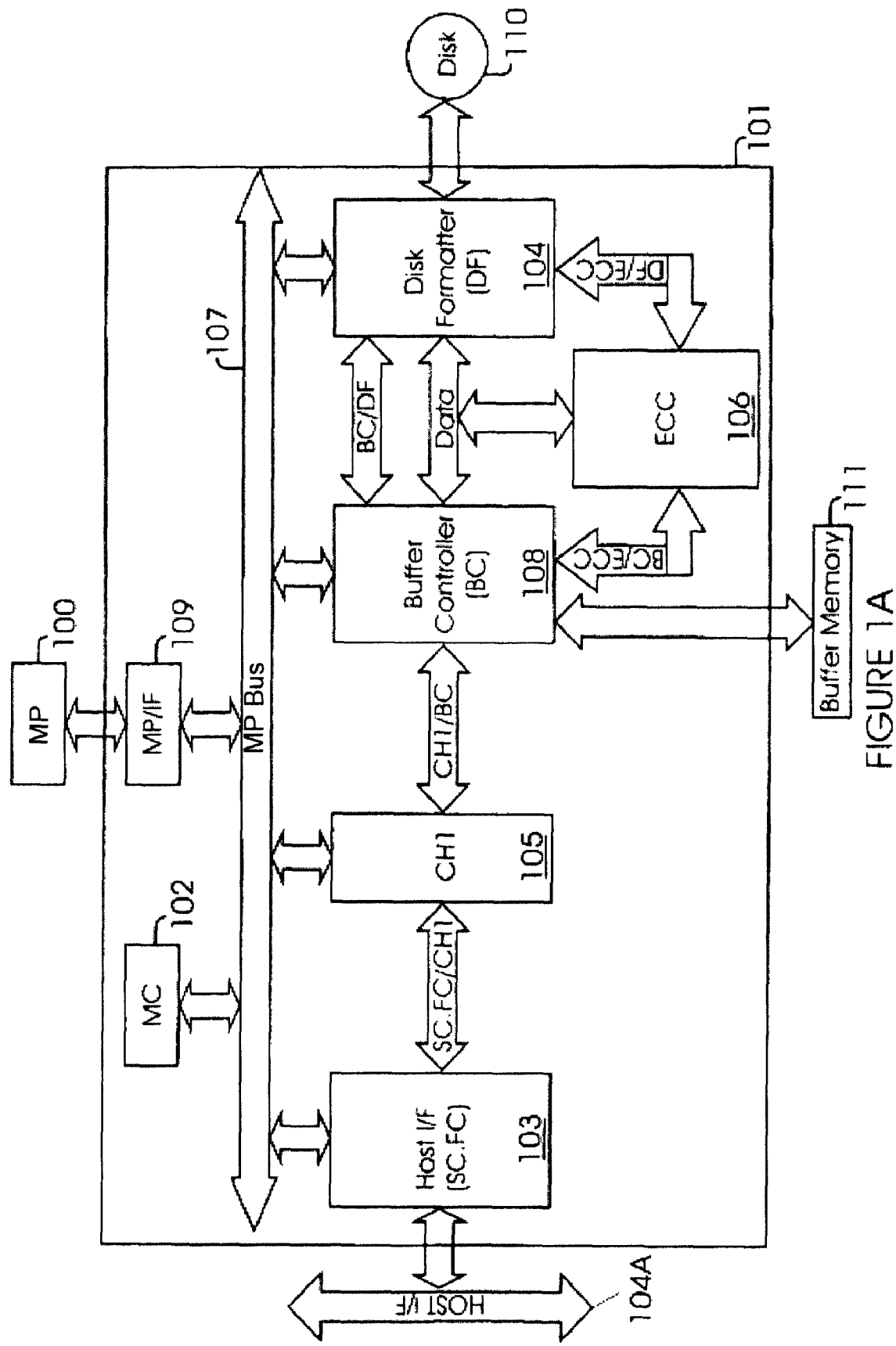
FIG. 1A shows a block diagram of a storage system used according to one aspect of the present invention.

The system of FIG. 1A is an example of a storage drive system (with an optical disk or tape drive), included in (or coupled to) a computer system. The host computer (not shown) and the storage device 110 (also referred to herein as disk 110) communicate via a port using a disk formatter "DF" 104. In an alternate embodiment (not shown), the storage device 110 is an external storage device, which is connected to the host computer via a data bus. The data bus, for example, is a bus in accordance with a Small Computer System Interface (SCSI) specification. Those skilled in the art will appreciate that other communication buses known in the art can be used to transfer data between the drive and the host system.

As shown in FIG. 1A, the system includes controller 101, which is coupled to buffer memory 111 and microprocessor 100. Interface 109 serves to couple microprocessor bus 107 to microprocessor 100 and a micro-controller 102. A read only memory ("ROM") omitted from the drawing is used to store firmware code executed by microprocessor 100. Host interface 103 in controller 101 interfaces with interface 104A to communicate with a host system (not shown).

Controller 101 can be an integrated circuit (IC) that comprises of various functional modules, which provide for the writing and reading of data stored on storage device 110. Microprocessor 100 is coupled to controller 101 via interface 109 to facilitate transfer of data, address, timing and control information. Buffer memory 111 is coupled to controller 101 via ports to facilitate transfer of data, timing and address information. Buffer memory 111 may be a double data rate synchronous dynamic random access memory ("DDR-SDRAM") or synchronous dynamic random access memory ("SDRAM"), or any other type of memory.

Disk formatter 104 is connected to microprocessor bus 107 and to buffer controller 108. A direct memory access ("DMA") DMA interface (not shown) is connected to microprocessor bus 107 and to data and control port (not shown).

Buffer controller (also referred to as "BC") 108 connects buffer memory 111, channel one (CH1) 105, error correction code ("ECC") module 106 and to microprocessor bus 107. Buffer controller 108 regulates data movement into and out of buffer memory 111.

Data flow between a host and disk passes through buffer memory 111. ECC module 106 generates the ECC that is saved on disk 110 writes and provides correction mask to BC 108 for disk 110 read operation.

Plural channels may be used to allow data flow. Channels (for example, channel 0 ("CH0"), channel 1 ("CH1") and channel 2 ("CH2")) are granted arbitration turns when they are allowed access to buffer memory 111 in high speed burst write or read for a certain number of clocks. The plural channels use first-in-first out ("FIFO") type memories to store data that is in transit. CH1 105 may be inside BC 108 or outside BC 108, as shown in FIG. 1. Another channel (CH2) may also be provided so that controller 101 can be used with different systems. Firmware running on microprocessor 100 can access the channels based on bandwidth and other requirements. CH0 108D within BC 108, can process new symbol based (i.e. 10-bit) data format, according to one aspect of the present invention, as described below.

To read data from storage device 110, a host system sends a read command to controller 101, which stores the read commands in buffer memory 111. Microprocessor 100 then reads the command out of buffer memory 111 and initializes the various functional blocks of controller 101. Data is read from storage device 110 and is passed to buffer controller 108.

To write data, a host system sends a write command to controller 101 and is stored in buffer memory 111. Microprocessor 100 reads the command out of buffer memory 111 and sets up the appropriate registers. Data is transferred from the host and is first stored in buffer memory 111, before being written to disk 110. CRC values are calculated based on the logical block address ("LBA") for the sector being written. Data is read out of buffer memory 111, appended with ECC code and written to disk 110.

Figure 1B:
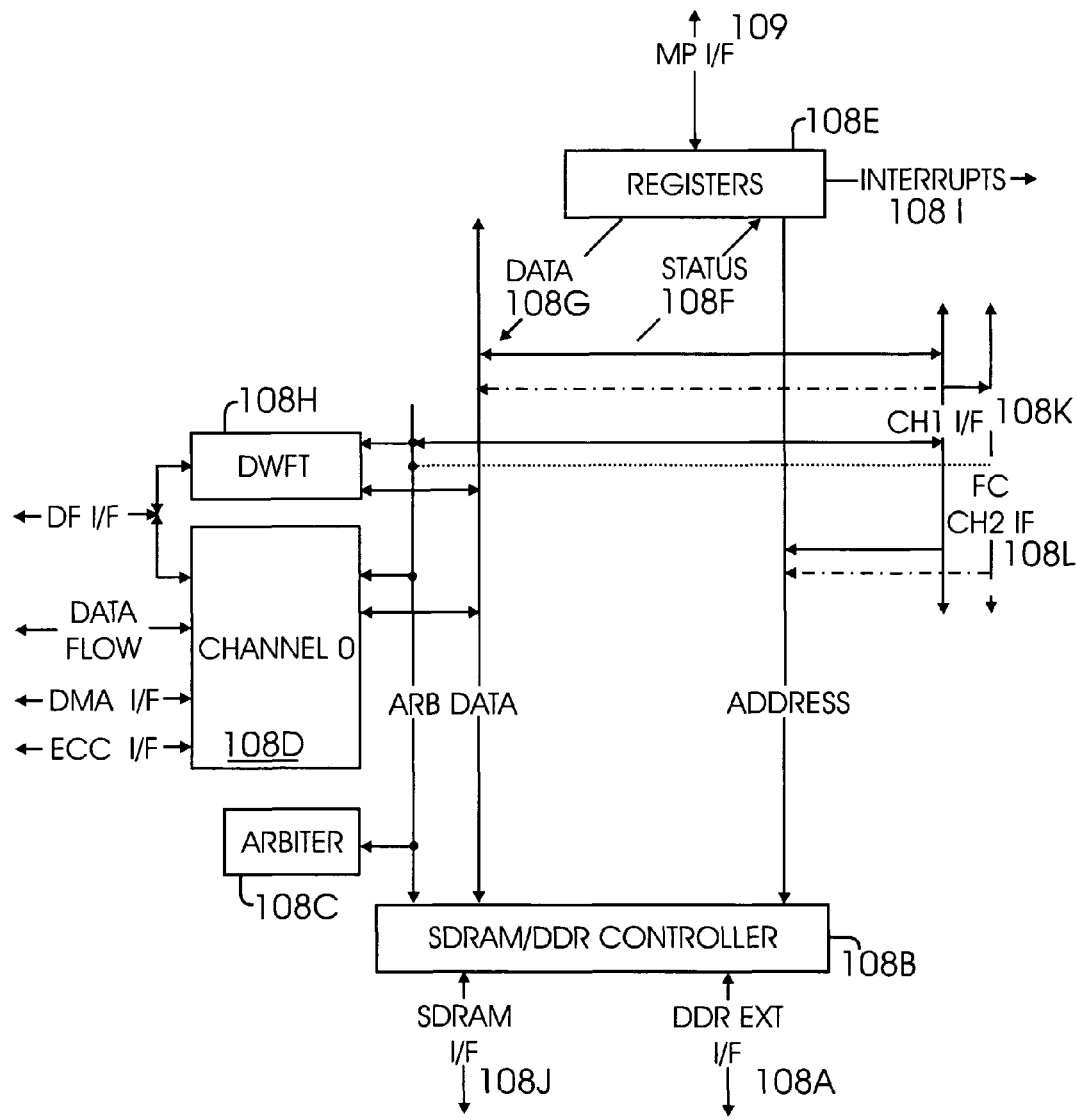
FIG. 1B is a block diagram of a buffer controller, used according to one aspect of the present invention.

Buffer Controller 108:

FIG. 1B shows a block diagram of BC 108 with CH0 108D that interfaces with DF 104 for moving data to and from buffer memory 111. BC 108 includes register(s) 108E and an Arbiter 108C. Arbiter 108C arbitrates between plural channels in BC 108, for example, CH0 108D, and CH1 105 and CH2 (not shown). CH0 108D interfaces with DF 104, ECC module 106 and a DMA module (not shown).

Register 108E is coupled to interface 109 via bus 107 that allows microprocessor 100 and BC 108 to communicate. Data 108G and status 108F is moved in and out of register 108E. Interface 108K and 108L allow BC 108 to interface with CH1 105 and CH2.

BC 108 uses a data wedge format table "DWFT" 108H to process a data wedge for disk operations.

BC 108 also includes a memory controller 108B that interfaces with buffer memory 111 through a synchronous dynamic random access memory ("SDRAM") interface 108J or DDR-SDRAM interface 108A (referred to as DDR-EXT I/F in FIG. 1B). Interrupts 108I are sent from buffer controller 108 to microprocessor 100.

Data Format:

Before describing CH0 108D, the following provides a description of the data format as used by disk 110. As stated earlier data to and from disk 110 is now preferably moved in a 10-bit format. Table 1 below shows a mapping between four symbols into five bytes. Symbol based data comes from DF 104 (i.e. disk 110). Symbol pairs are grouped and stored as sectors on disk 110, i.e., the size of the sectors is an integer of the number of symbol pairs.

TABLE I

| Symbol | Bit Number | | | | | | | | | |
|---|---|---|---|---|---|---|---|---|---|---|
| No. | 9 | 8 | 7 | 6 | 5 | 4 | 3 | 2 | 1 | 0 |
| 0 | B1-1 | B1-0 | B0-7 | B0-6 | B0-5 | B0-4 | B0-3 | B0-2 | B0-1 | B0-0 |
| 1 | B2-3 | B2-2 | B2-1 | B2-0 | B1-7 | B1-6 | B1-5 | B1-4 | B1-3 | B1-2 |
| 2 | B3-5 | B3-4 | B3-3 | B3-2 | B3-1 | B3-0 | B2-7 | B2-6 | B2-5 | B2-4 |
| 3 | B4-7 | B4-6 | B4-5 | B4-4 | B4-3 | B4-2 | B4-1 | B4-0 | B3-7 | B3-6 |

The format of the data in buffer memory 111 is still in 8-bit sizes, i.e., byte oriented. Table II below shows the format of the data that is stored in buffer memory 111. Data is aligned on a Mod 4 buffer address with a Mod 4 byte size. Data includes 4 bytes of cyclic redundancy code ("CRC"), if CRC is enabled.

Table II below assumes a starting address of 0, however, the starting address could be any even multiple of 4.

n=number of DWORDS in sector—a 516 byte sector has 129 (516/4=129) or 0-128.

DWn=last DWORD in a sector

Bn=last byte of data in the sector not including CRC

Data represented in buffer memory 111 is typically the host data block. This data is written and read from disk 110. The host data is in bytes and is written to and read from the disk 110 across a symbol based interface.

TABLE II

| Dword | Bit | | | | Buffer |
|---|---|---|---|---|---|
| Number | BD[31:24] | BD{23:16] | BD[15:8] | BD[7:0] | Address |
| 0 | B3 | B2 | B1 | B0 | 0 |
| 1 | B7 | B6 | B5 | B4 | 3 |
| . | . | . | . | . | . |
| . | . | . | . | . | . |
| . | . | . | . | . | . |
| DWn-1 | Bn | Bn-1 | Bn-2 | Bn-3 | (DWn-1 × 4) − 1 |
| DWn | CRC-B3 | CRC-B2 | CRC-B1 | CRC-B0 | (DWn × 4) − 1 |

CH0 108D logic provides access to buffer memory 111 with the byte based data format, and access the DF 104 symbol based format, and translates between the two formats, according to one aspect of the present invention, as described below.

Channel 0 108D:

It is noteworthy that although the description below is based on a data format size of 10 bit and 8 bit, the adaptive aspects of the present invention are not limited to these two sizes. For example, data from disk 110 can be in X-bit format and stored in buffer memory 111 in Y-bit format, and CH0 108D architecture allows translation between the two formats (i.e. X and Y bit formats).

Figure 2A:
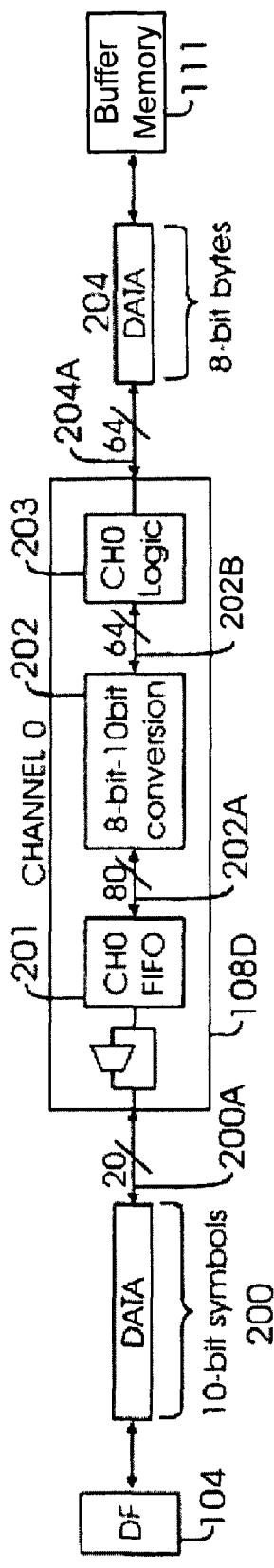
FIG. 2A shows the data path between a disk formatter and a buffer memory, according to one aspect of the present invention.

FIG. 2A shows a block diagram with the data path between DF 104 and buffer memory 111. Data 200 as 10-bit symbols is sent or read from DF 104 via bus 200A. CH0 FIFO 201 is used to store data when it is being transferred between buffer memory 111 and DF 104. Logic 202 converts the data format from 10-bit to 8-bit and 8-bit to 10-bit. Logic 203 receives data to and from buffer 111 and logic 202. Data 204 is 8-bit bytes that is received from or sent to buffer memory 111 via bus 204A. Bus 202A is 80-bit wide and 202B is 64-bit wide.

Buffer Memory 111 Read Operations:

When data is read from buffer memory 111 and sent to DF 104, it can start at any memory address. CH0 logic 203 reads data from interface 108J or 108A (may be referenced interchangeably as interface 108J) and passes the data to logic 202. Logic 202 assembles 80-bit words to write into CH0 FIFO 201. The last symbol that is written into CH0 FIFO 201 includes pad bits if the transfer size length in bits (plus CRC bits) is not MOD10. Filler bits may also be used to achieve MOD8 symbol size on a last FIFO write, as described below. "MOD" in this context, as used throughout this specification, means the data alignment.

Figure 2B:
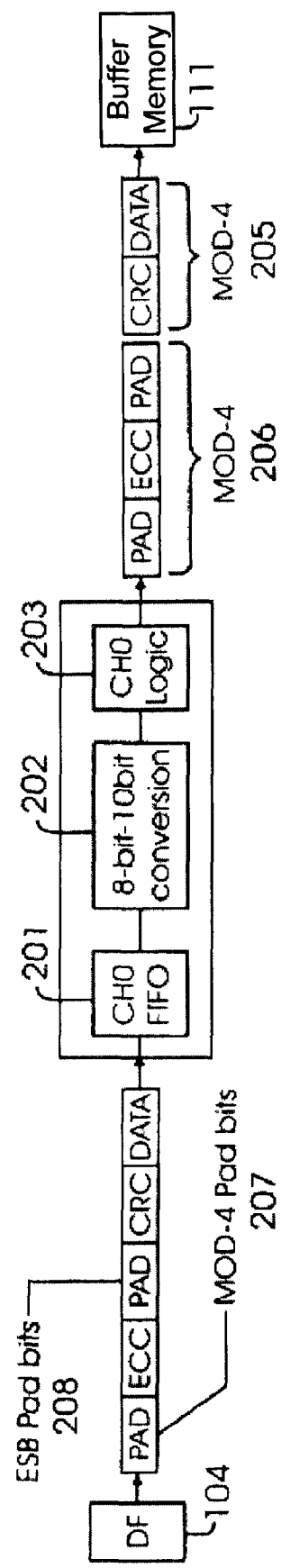
FIG. 2B shows the data path for Read-Long data, according to one aspect of the present invention.

Buffer Memory 111 Write Operations:

Buffer write operation involves moving data from DF 104 (as shown in FIG. 2A) to buffer memory 111. Data is first written into CH0 FIFO 201 beginning at the even MOD-4 boundary (i.e. the start of a CH0 FIFO word). CH0 108D aligns data from DF 104 so that the first data block is written into CH0 FIFO 201 with even MOD4 boundary. Logic 202 then reads 8 symbols at a time and assembles data into an 8-bit MOD-4 format. This conversion removes even symbol boundary ("ESB") pad bits, if any, that were appended to the last data symbol (FIG. 2B).

During Read-Long commands, CH0 108D does not remove ESB pad bits, since all data from disk 110 is sent to buffer memory 111. During a normal read operation, only data moves from disk 110 to buffer memory 111, however, during a read-long operation, data with ECC bytes and CRC bytes are sent to buffer memory 111 as well. FIG. 2B shows the data path for Read-Long data. ESB pad bits 208 and MOD-4 pad bits 207 are sent with the data to CH0 FIFO 201. Data that is sent into buffer memory 111 is shown as 205 and 206. Block 205 includes data and CRC, while block 206 includes ESB pad bits and the ECC.

Figure 3A:
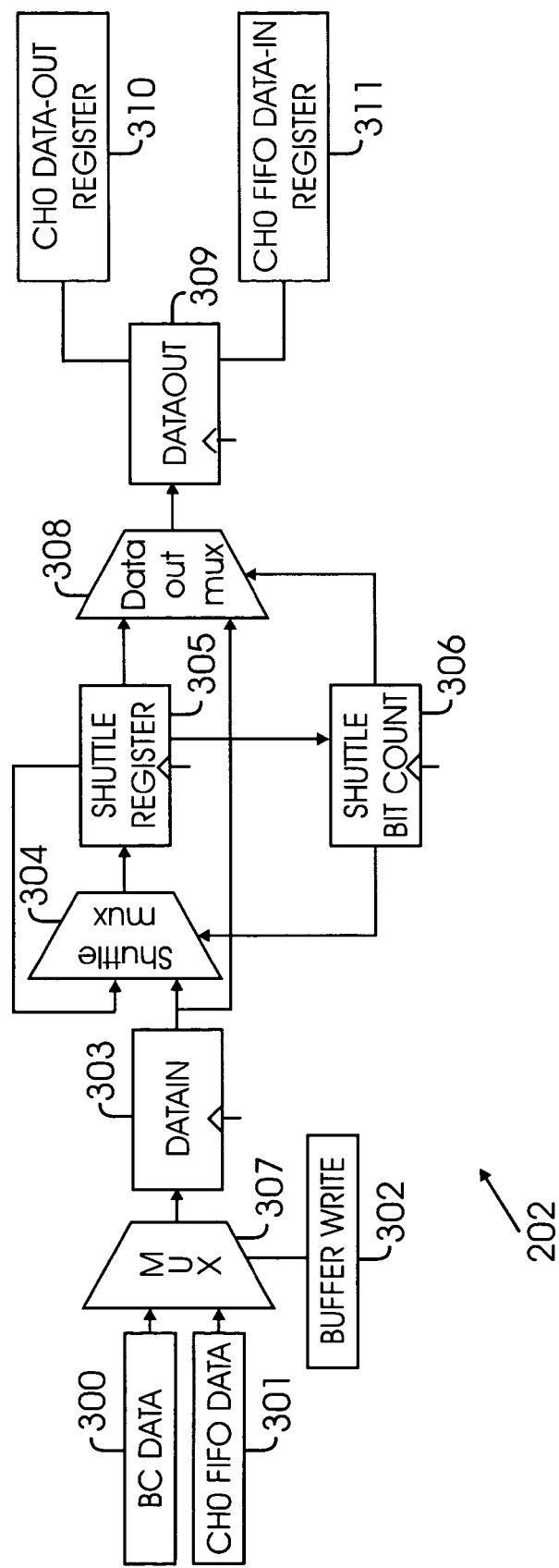
FIG. 3A shows a block diagram of conversion logic, according to one aspect of the present invention.

Conversion Logic 202:

FIG. 3A shows a block diagram of logic 202, according to one aspect of the present invention. Logic 202 interfaces to a 64-bit bus 204A on one side and 80-bit bus 202A on another side. Logic 202 uses DATAIN register 303, shuttle register 305 and DATAOUT register 309 to perform bus width conversions.

Data that is read from buffer memory 111 is shown as 300. Data that is written to buffer memory 111 is shown as 301 that is stored in CH0 FIFO 201 before being written.

"DATAIN register" 303 receives data 300 from buffer memory 111 or CH0 FIFO data 301 through a multiplexer ("Mux") 307. Thereafter, register 303 provides data to conversion logic. In one aspect of the present invention, DATAIN register 303 is 10 bytes wide during a read operation. It is noteworthy that the present invention is not limited to any particular size of any of the registers that are described herein.

Buffer write signal 302 provides a control input to Mux 307 so that data can be written to buffer memory 111.

Shuttle register 305 holds data temporarily before it is sent out to DATAOUT register 309. Shuttle register 305 uses shuttle Mux 304 to concatenate data that is received from "DATAIN register" 303 with data that is being held in shuttle register 305. A counter 306 counts the number of valid data bytes in shuttle register 305.

FIG. 3B shows a table that illustrates how Mux 304 aligns data into the shuttle register 305. The table is divided in two parts, one for a write operation and another for a read operation. The following describes the various column headings that are used in FIG. 3B table:

"In_Datain": This column shows the number of bytes in DATAIN register 303;

"In_Shuttle": This column shows the number of bytes in shuttle register 305 at any given time;

"Word_Sel": This column shows the word lane within DATAIN register 303 where the data starts;

"B_Wr": This column indicates buffer write operation;

"sh7 to sh0": This column shows the output of shuttle Mux 304; and

"d09-d00": This column represents the data that is going into DATAOUT register 309 and shows how data is concatenated.

Buffer memory 111 write operations start from low word. In one aspect for buffer memory write 111, only 8 bytes are used and hence d08 and d09 columns are not used, as shown in FIG. 3B table. For write operations FIFO data 301 is in 10 bytes and data from DATAOUT register 309 is 8 bytes. Hence, each time FIFO data 301 is read, there is a remainder of 2 bytes. This remainder of 2 bytes is stored and accumulated in shuttle register 305. Once the number of accumulated bytes in shuttle register 305 reaches 8, then shuttle register 305 data is written into DATAOUT register 309 without reading FIFO data 301. This is shown as overflow entry 312 in FIG. 3B.

In buffer memory 111 read operation, logic 202 using the shuttle mechanism can start or end in either D-word of the 64 bit bus 204A. Since sector size is MOD4, only 4 or 8 bytes are used.

Figure 3C:
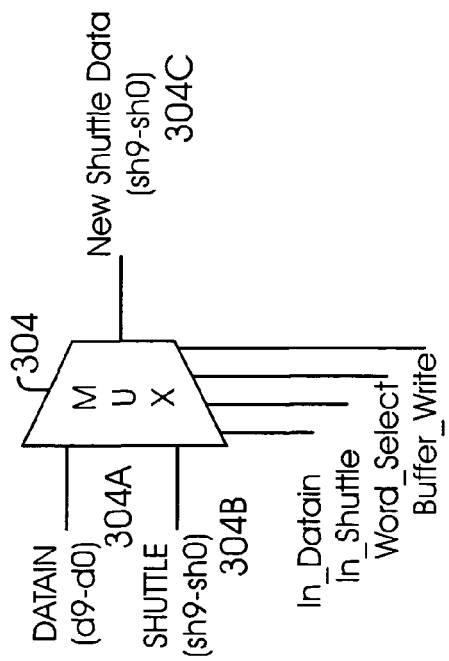
FIG. 3C shows a schematic of a MUX producing an output, according to one aspect of the present invention.

FIG. 3C shows a schematic of MUX 304, with inputs 304A and 304B producing output 304C. Signals In_Datain, In_Shuttle, Word_Select and Buffer_Write have been described above with respect to FIG. 3B.

Tables III-V below show the byte count present at three stages and the progress of the residue (i.e., last byte in shuttle register 305) left in shuttle register 305. The illustration is based on when the read operation starts at an odd D_word boundary and ends in an Odd D_word boundary (Table III), starts on an odd boundary but ends in an even boundary (Table IV), and then starts on an even boundary and ends in an odd boundary (Table V).

Tables III and IV show the first cycle with 4 bytes where a transfer of data from buffer 111 starts on the odd D-Word boundary. Tables III and IV also show 4 bytes on the last cycle where BC interface 108J is able to end on a single D-Word transfer. The highest byte count in shuttle register 305 is still 8 bytes.

TABLE III

BC Odd-Start, Odd-End

| BYTES_IN_DataIn | BYTES_IN_SHUTTLE | BYTES_IN_DataOut |
|---|---|---|
| 4 | 0 | 0 |
| 8 | 4 | 0 |
| 8 | 2 | 10 |
| 8 | 0 | 10 |
| 8 | 8 | 0 |
| 8 | 6 | 10 |
| 8 | 4 | 10 |
| 4 | 2 | 10 |
| 0 | 6 | 0 |

TABLE IV

BC Odd-Start, Even-End

| BYTES_IN_DataIn | BYTES_IN_SHUTTLE | BYTES_IN_DataOut |
|---|---|---|
| 4 | 0 | 0 |
| 8 | 4 | 0 |
| 8 | 2 | 10 |
| 8 | 0 | 10 |
| 8 | 8 | 0 |
| 8 | 6 | 10 |
| 8 | 4 | 10 |
| 0 | 2 | 10 |

TABLE V

BC Even-Start, Odd-End

| BYTES_IN_DataIn | BYTES_IN_SHUTTLE | BYTES_IN_DataOut |
|---|---|---|
| 8 | 0 | 0 |
| 8 | 8 | 0 |
| 8 | 6 | 10 |
| 8 | 4 | 10 |
| 8 | 2 | 10 |
| 4 | 0 | 10 |
| 0 | 4 | 0 |

As discussed above, "DATAOUT register" 309 holds data before it is moved out. In one aspect "DATAOUT register" 309 is 10 bytes wide and only 8 bytes are used for buffer memory 111 write operations. "DATAOUT register" 309 is written when shuttle register 305 and the number of bytes in DATAIN register 303 is equal to the bus width needed for the operation (i.e., 10 bytes during buffer memory 111 read and 8 bytes during buffer memory 111 write). Mux 308 is used to align data into the proper bus width. (See FIG. 3B table).

Padding: If the length of a data block is not MOD10, then padding may be used on the last symbol so that it can be written in CH0 FIFO 201. During buffer memory 111 read operations, the pad bits allow ECC insertion at ESB. Logic 202 removes the ESB pad bits during buffer memory 111 write operations. ESB pad bits are not removed during Read-Long commands as raw data from DF 104 is sent to buffer memory 111 (see FIG. 2B).

Filler Bits: Filler bits are bits that are added at the end of a FIFO word, but are not sent to disk 110. Logic 202 accesses CH0 FIFO 201 8 symbols at a time. This allows writing the first symbol of a transfer into even MOD4 boundary of CH0 FIFO 201 (at the beginning of a FIFO word). If data transfer length is not MOD8 symbols, the last CH0 FIFO 201 write is accompanied by filler strobes to CH0 FIFO 201, if needed, at the end of disk reads.

Sector Count: Logic 202 uses a counter 201G (FIG. 6) to stop data conversion at a sector boundary. Counter 201G loads the sector size in bytes from a transfer counter register (not shown) and logic 202 accesses data 301. Counter 201G is decremented by 10 for each access (10 byte access) and when FIFO sector count is zero, the conversion by logic 202 stops. Conversion resumes when state machine 203A sends a signal.

Figure 4:
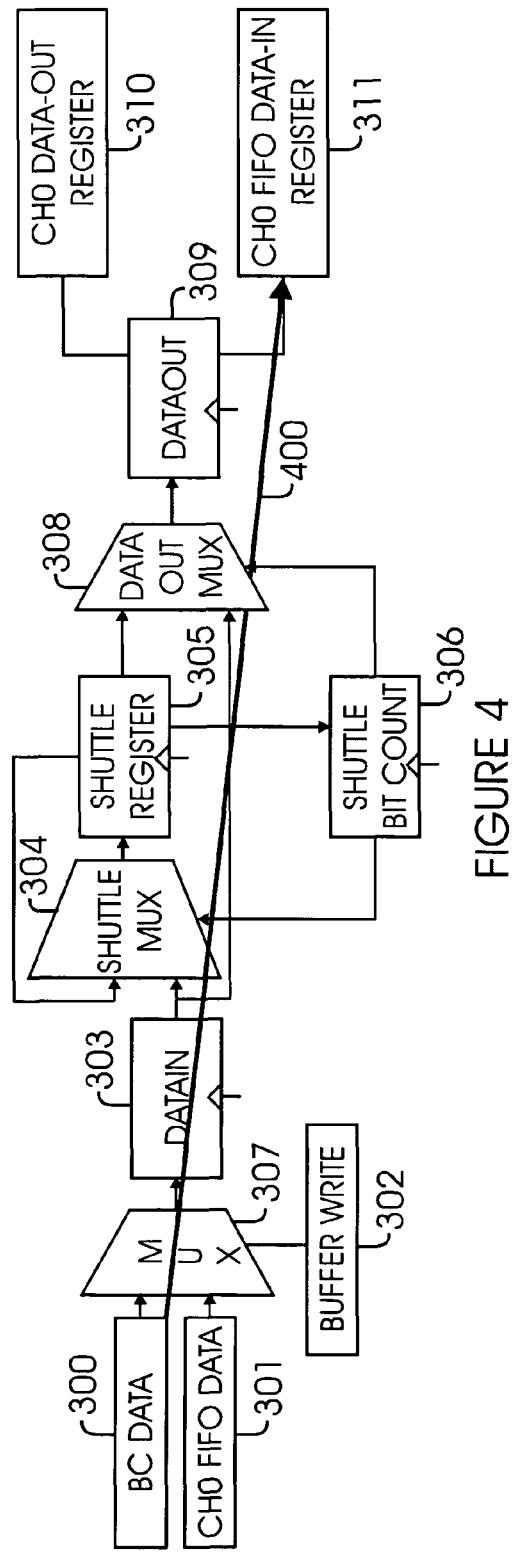
FIG. 4 shows the read path during a buffer read operation, according to one aspect of the present invention.

Packing Symbols During Read Operations:

To create symbols from bytes, logic 202 packs data from a 64-bit bus 204A into an 80-bit bus 202A. Shuttle register 305 is used to store data temporarily. Data 300 from buffer memory 111 comes into "DATAIN register" 303 and then shuttle register 305 data and "DATAIN register" 303 data is concatenated and assembled into an 80-bit bus 202A. FIG. 4 shows the read path 400 during buffer memory 111 read operation. Data moves from buffer memory 111 to register 311.

Table VI below shows the byte count present during the operation. "DATAOUT register" 309 is written when Bytes_IN_DataIn (register 303 bytes) and BYTES_IN_Shuttle (data in shuttle register 305) reach a count of 10 or more. The last row in Table VI shows that 6 bytes are left in shuttle register 305. Logic 202 uses FIFO sector counter 201G to detect the end of the sector and force the residual shuttle bytes into CH0 FIFO 201. Firmware can also force the residue into CH0 FIFO 201.

TABLE VI

Even_ Start, Even End

| BYTES_IN_DataIn | BYTES_IN_SHUTTLE | BYTES_IN_DataOut |
|---|---|---|
| 8 | 0 | 0 |
| 8 | 8 | 0 |
| 8 | 6 | 10 |
| 8 | 4 | 10 |
| 8 | 2 | 10 |
| 8 | 0 | 10 |
| 8 | 8 | 0 |
| 8 | 6 | 10 |
| 8 | 4 | 10 |
| 8 | 2 | 10 |
| 8 | 0 | 10 |

TABLE VI-continued

Even_Start, Even End

| BYTES_IN_DataIn | BYTES_IN_SHUTTLE | BYTES_IN_DataOut |
|---|---|---|
| 8 | 8 | 0 |
| 0 | 6 | 10 |

Figure 5:
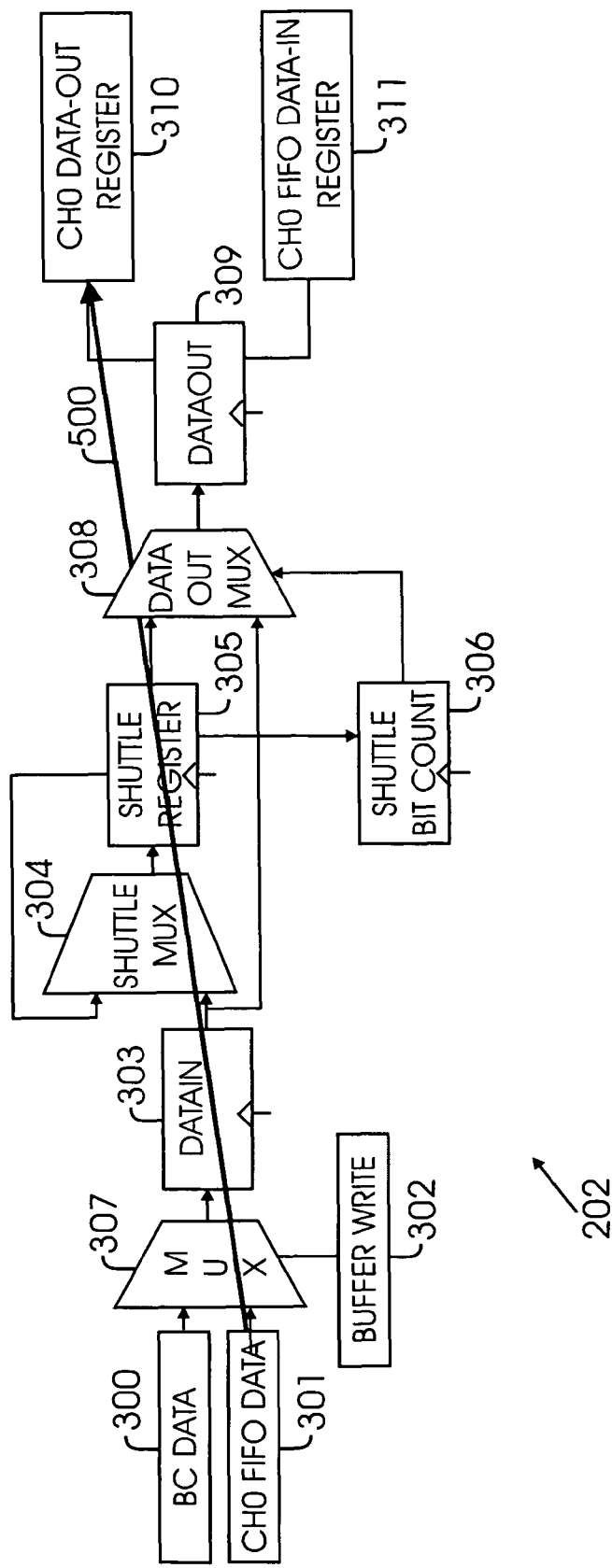
FIG. 5 shows the write path during a buffer read operation, according to one aspect of the present invention.

Unpacking Symbols During Write Operation:

To create bytes from symbols, logic 202 unpacks 80-bit bus 202A data into 64-bit bus 204A data. FIFO data 301 enters "DATAIN register" 303. Data from shuttle register 305 and "DATAIN register" 303 are concatenated and assembled into 64-bit bus 204 data. "DATAOUT register" 309 writes into register 310, 8 bytes at a time. FIG. 5 shows the data path 500 for the write operation. Table VII below shows the byte count during the write operation. Register 310 is provided 8 bytes of data continuously to avoid delay. FIFO data 301 is not read when shuttle register 305 count reaches 8, as discussed above. Table VII shows a byte count table for data 301 movement to register 310.

TABLE VII

| BYTES_IN_DataIn | BYTES_IN_SHUTTLE | BYTES_IN_DataOut |
|---|---|---|
| 10 | 0 | 0 |
| 10 | 2 | 8 |
| 10 | 4 | 8 |
| 10 | 6 | 8 |
| 0 | 8 | 8 |
| 10 | 0 | 8 |
| 10 | 2 | 8 |
| 10 | 4 | 8 |
| 10 | 6 | 8 |
| 0 | 8 | 8 |
| 10 | 0 | 8 |
| 10 | 2 | 8 |
| 10 | 4 | 8 |
| 10 | 6 | 8 |
| 0 | 8 | 8 |
| 10 | 0 | 8 |
| 10 | 2 | 8 |
| 10 | 4 | 8 |

Figure 6:
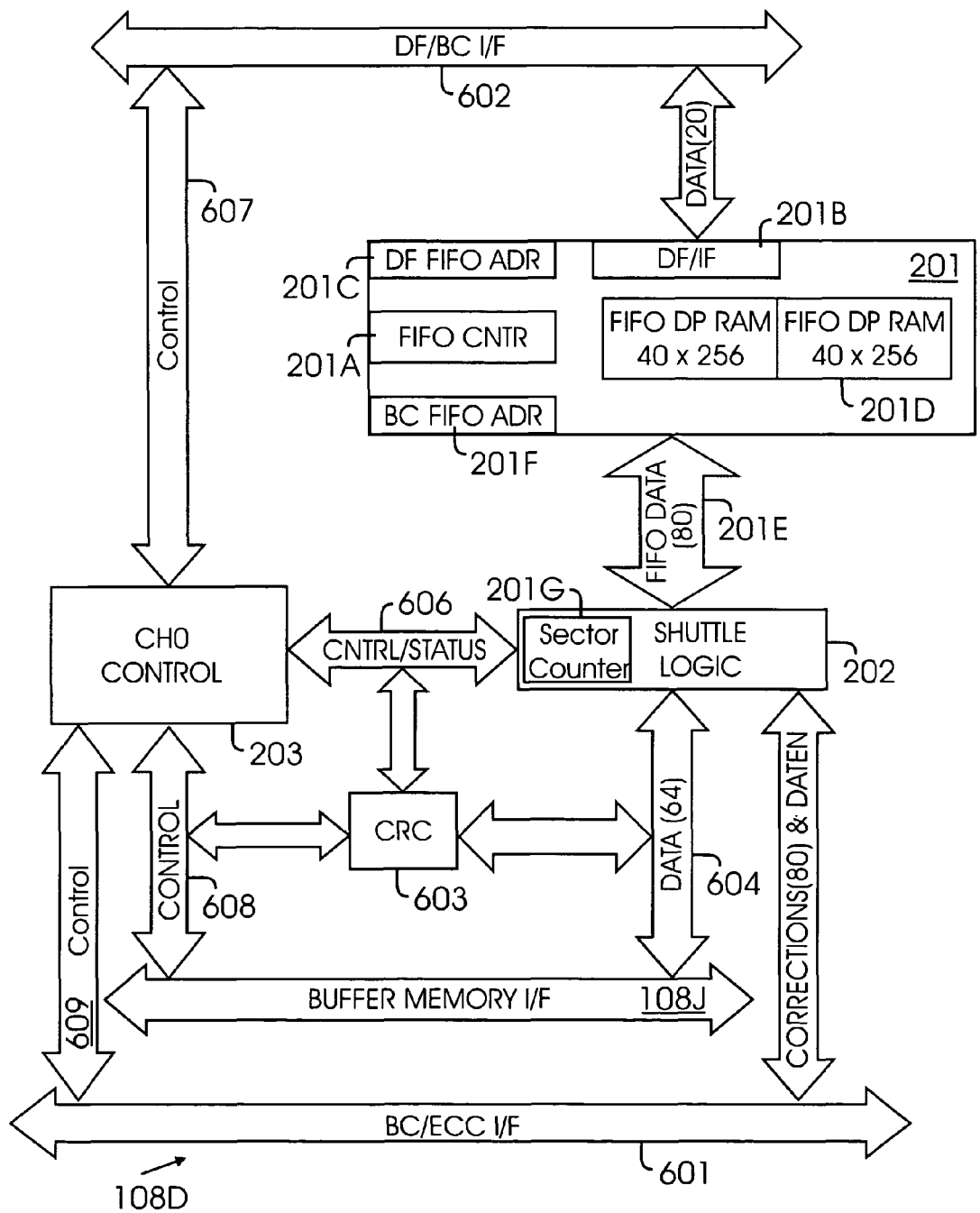
FIG. 6 shows a block diagram for a channel (CH0) that facilitates buffer read and write operations, according to one aspect of the present invention.

CH0 Logic 203:

FIG. 6 shows another block diagram for CH0 108D that facilitates buffer memory 111 read and write operations. Control logic 203 interacts with buffer memory 111 and DF 104 through interfaces 602, 108J and 601. Control information 607, 608 and 609 is passed between logic 203, DF 104, buffer memory 111 and ECC module 106.

Logic 203 handles protocols for DF 104, buffer memory 111, ECC 106 and the FIFO interfaces. Data is moved via CH0 FIFO 201 that in one aspect has a dual port random access memory ('RAM") address pointers 201C and 201F, FIFO counter 201A and interface logic 201B to interface with DF 104. CH0 FIFO 201 includes memory ("RAM") 201D that is used to store data blocks. The term FIFO as used throughout this specification means "first-in-first out". Data 201E (on 80 bit bus 202A) is passed to logic 202 as discussed above. Data 604 from logic 202 leaves on a 64-bit bus 203B (see FIG. 2A). CRC module 603 provides CRC data when needed. It is noteworthy that CH0 FIFO 201 throughout this specification means the entire module that includes memory 201D.

Figure 7:
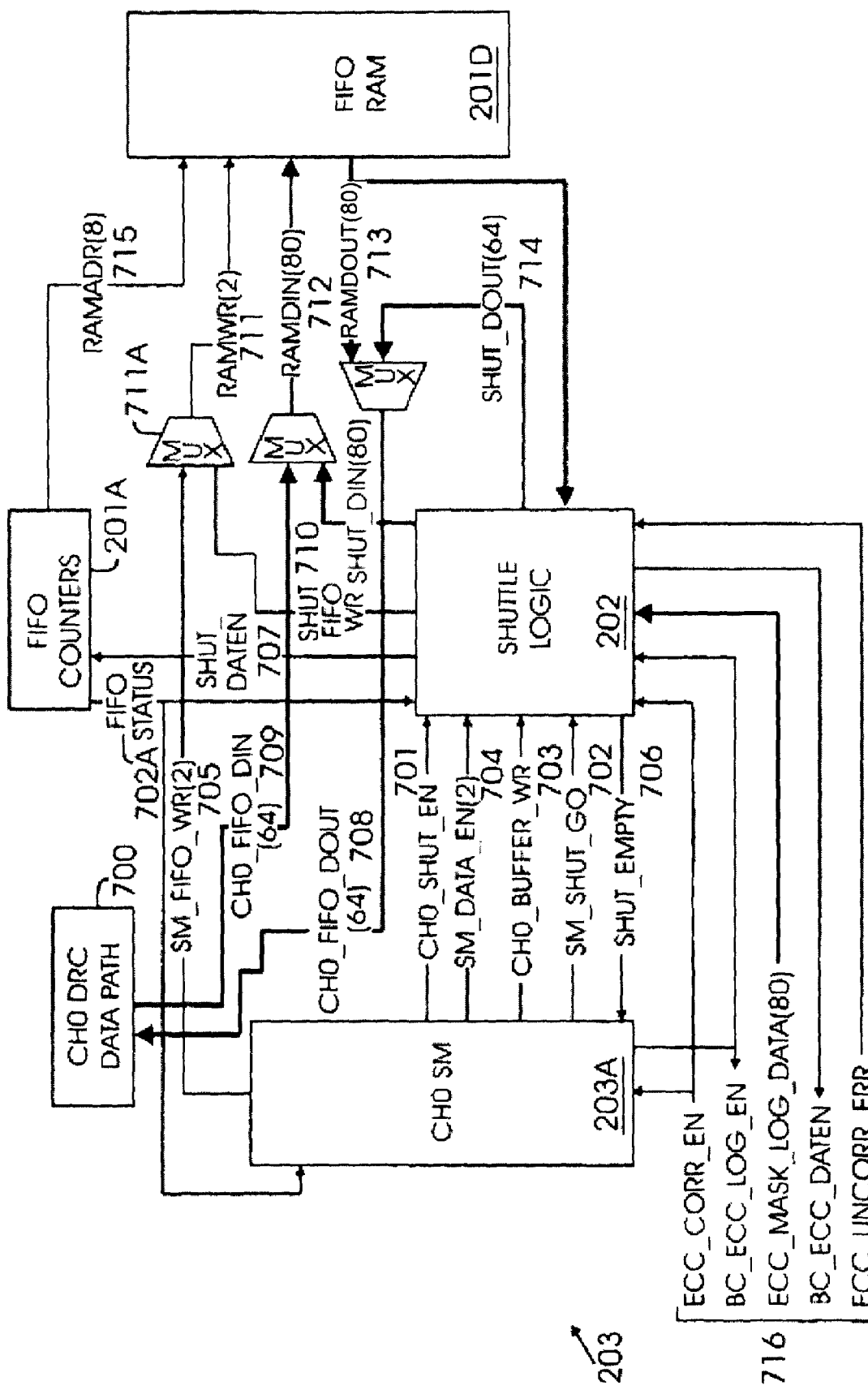
FIG. 7 shows a schematic of CH0 control logic with a state machine that interfaces with conversion logic, according to one aspect of the present invention.

FIG. 7 shows a detailed schematic of CH0 control logic 203 with a state machine 203A that interfaces with logic 202. Data path 700 has been described above. The following provides a description of various signals that are used in FIG. 7 to accomplish the adaptive aspects of the present invention:

Signal 701 (CH0_SHUT_EN) enables the shuttle function in CH0 108H and allows byte to symbol translation, as described above. Upon reset, logic 202 is disabled and logic 203 accesses CH0 FIFO 201 as a 64 bit wide FIFO.

Signal 702 (SM_SHUT_GO) is generated by state machine 203A and when active indicates that logic 202 should start processing data. This signal is set active when state machine 203A is ready to process a next sector and set inactive once data transfer begins between logic 202 and interface 108J.

Signal 703 (CH0_BUFFER_WR): This signal is generated from state machine 203A and indicates the transfer direction for data movement (i.e. from to buffer memory 111 or from buffer memory 111). When signal 701 is high it indicates that data moves from DF 104 to buffer memory 111.

Signal 704 (SM_DATA_EN) is driven by state machine 203A and is the data transfer strobe for accessing logic 202 / CH0 FIFO 201. Data is transferred each clock this signal is active (high).

Signal 705 (SM_FIFO_WR) is used by state machine 203A during logic 202 bypass mode to write to FIFO RAM 201D.

Signal 706 (SHUT_EMPTY) originates from logic 202 and is sent to state machine 203A. Signal 706 is used to hold off state machine 203A from starting buffer memory 111 data bursts until logic 202 is ready to start executing data transfers. When signal 706 is high during disk 110 read, it indicates that shuttle register 305 is empty and state machine 203A may not start a current sector since no data is available for buffer memory 111. During disk 110 write operation, signal 706 indicates that logic 202 is still busy on a current sector and the state 203A may not start the protocol for the next sector.

Signal 707 (SHUT_DATEN) is also driven by logic 202 to access CH0 FIFO 201. When active, signal 707 indicates an access to 201D. FIFO counter 201A increments by one on disk 110 write decrement on disk reads.

Signal 708 (CH0_$_{FIFO}$_DOUT) is driven from logic 202 when enabled to provide byte alignment, as described above.

Signal 709 (CH0_$_{FIFO}$_DIN) is the data driven from data path logic 700 (located at interface 108J) and is sent to logic 202 for conversion, as described above.

Signal 710 (SHUT_FIFO_WR) is generated by logic 202 for FIFO 201 write.

Signal 711 is generated from Mux 711A and sent to FIFO RAM 201D.

Signal (RAMDIN) 712 is data in to FIFO RAM 201D and signal (RAMDOUT) 713 is data out from FIFO RAM 201D to the data path logic 700.

Signal (SHUT DOUT) 714 is the data out from logic 202.

Signal (RAMADR) 715 is the RAM address from counters 201A. Signals 716 are various error correction signals that are received by state machine 203A and logic 202.

Counter(s) 201A counts CH0 FIFO 201 entries. The value in counter 201A represents CH0 FIFO 201 half words that have been written and not yet read.

Figure 8:
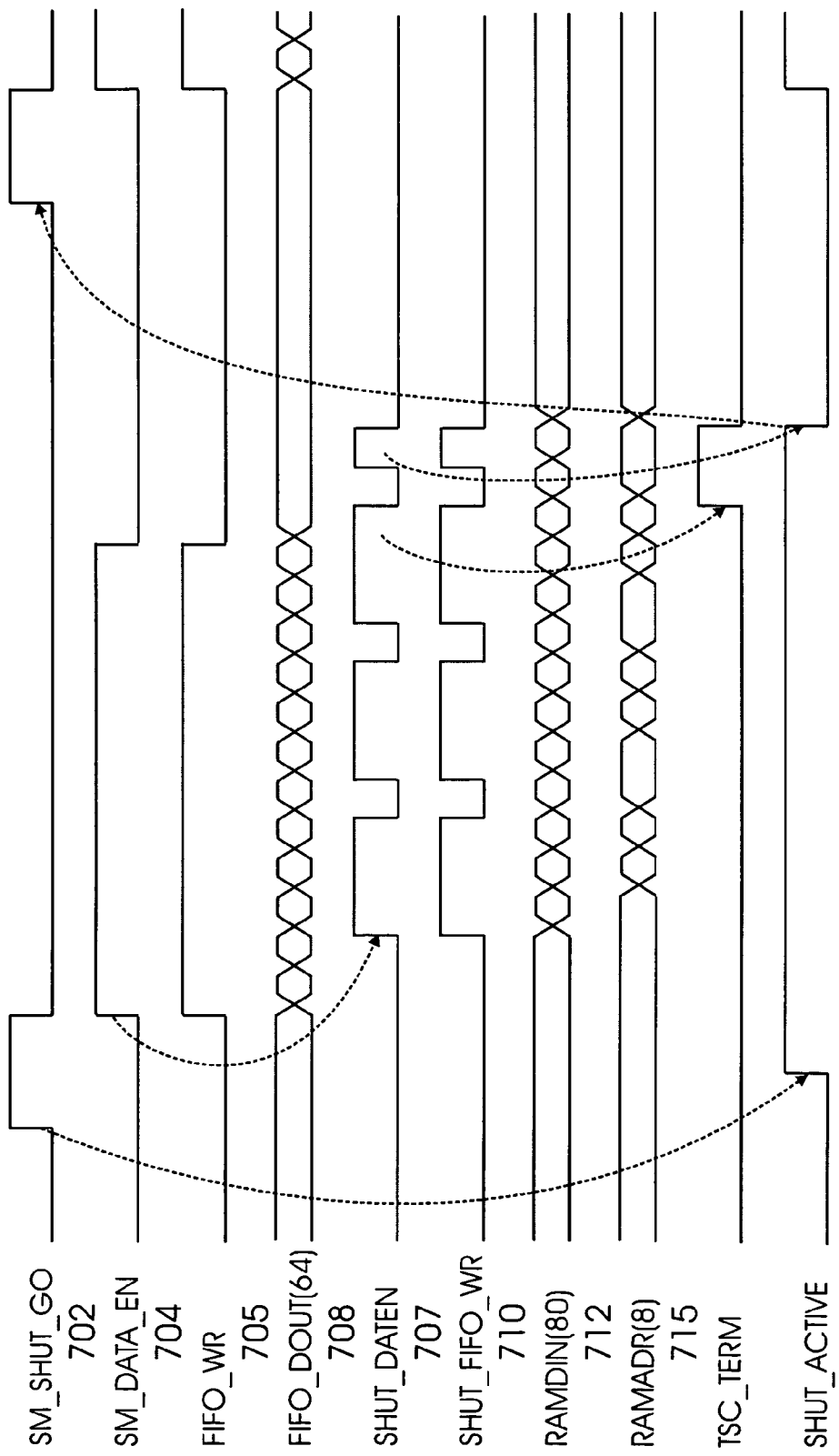
FIGS. 8 and 9 show the timing diagrams for the various signal for buffer write and read operations, according to one aspect of the present invention.
Figure 9:
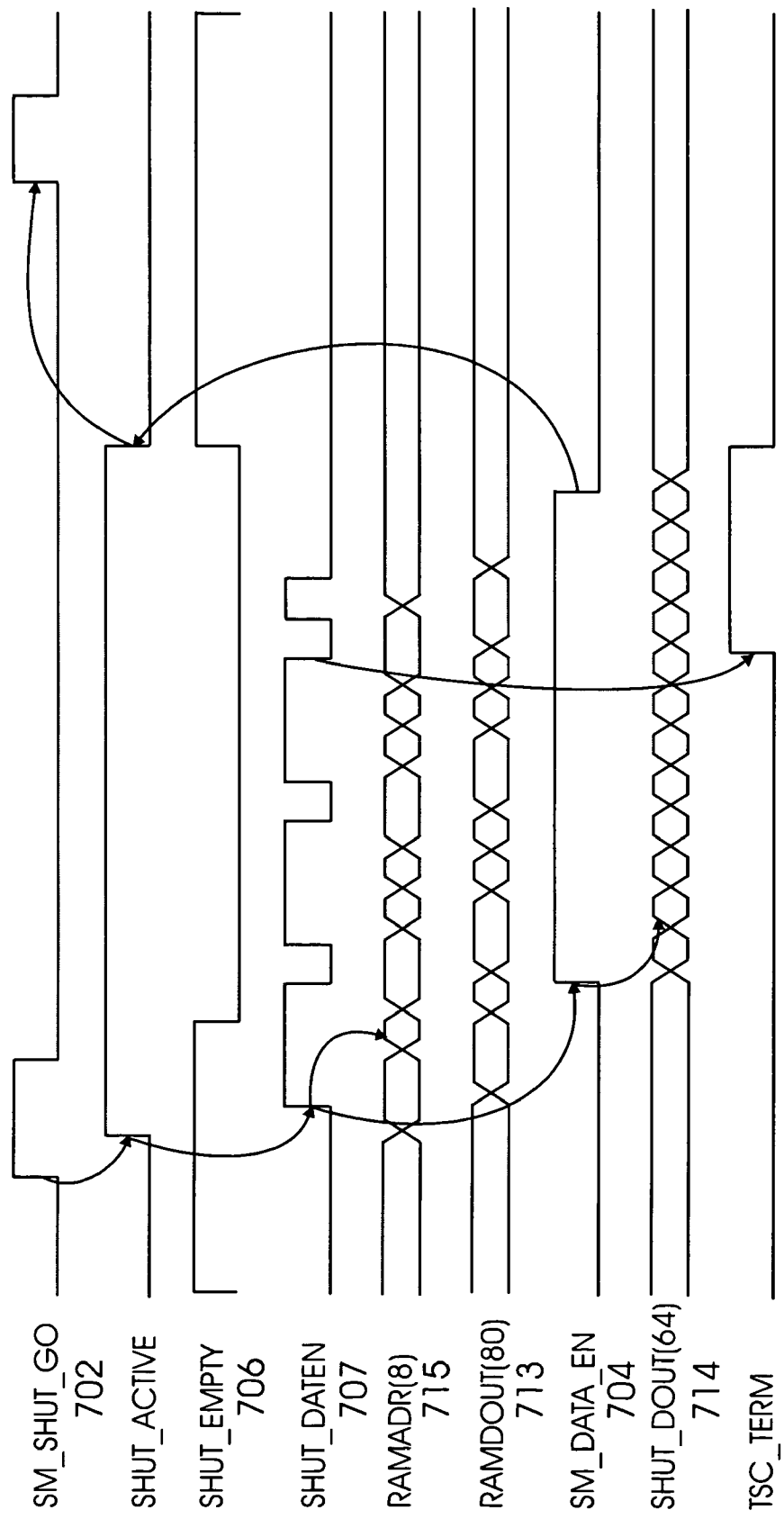

FIGS. 8 and 9 show the timing diagrams for the various signals (that are described above with respect to FIG. 7) for buffer memory 111 write and read operations, respectively. Signal TSC_TERM defines the time when FIFO sector count is zero.

FIG. 10 shows a process flow diagram of executable process steps, according to one aspect of the present invention. In step S1000, the process receives data. If data is being written to buffer memory 111, then data is received from DF 104 to CH0 FIFO 201, otherwise data is received by CH0 FIFO 201 from buffer memory 111.

In step S1001, the process determines if any format conversion is required. This is based on the data format supported by the storage device 110. For example, if data is coming from a tape drive (110), then no conversion is required and data is processed as 8-bit data in step S1004. If data is coming from a hard disk (110) that operates in a 10-bit format (or a format different from buffer memory 111), then conversion is required and logic 202 is enabled. This is achieved by signal 701 that is generated by state machine 203a (FIG. 7).

In step S1003, data is aligned by logic 202. In this case if data is being written from DF 104, then data is received in 10-bit format. Data from CH0 FIFO 201 is stored in shuttle register 305 and sent over bus 204A. Shuttle register 305 paces data transfer from CH0 FIFO 201 to avoid an overflow condition (FIG. 3B).

If data is being read from buffer 111, then logic 202, as described above moves the 8-bit data to a 10-bit format. Logic 202 is capable of moving data through buses with varying widths (bus 202A and 203A).

In step S1003, data is transferred after the conversion logic 202 has aligned the data based on storage device 110 and buffer memory 111 format requirements.

In one aspect of the present invention, same piece of logic is used to move data to and from buffer 111 in two different formats. This saves overall chip cost and improves data transfer performance.

Although the present invention has been described with reference to specific embodiments, these embodiments are illustrative only and not limiting. Many other applications and embodiments of the present invention will be apparent in light of this disclosure.

What is claimed is:

1. A storage controller for interfacing between a host and a disk drive, the storage controller comprising:
a buffer memory that stores data that is transferred between the host and the disk drive; and
a channel located on the storage controller that receives the data from the disk drive in one of a first format and a second format, and determines whether data conversion is required based on whether the data is in the first format or the second format, wherein the channel includes:
conversion logic that converts the data from the first format to the second format when the data conversion is required, maintains the data in the second format when the data conversion is not required, and stores the data in the buffer memory in the second format, and when the channel receives the data from the buffer memory in the second format, the conversion logic selectively converts the data from the second format to the first format and transfers the data to the disk drive in the first format,
wherein the conversion logic includes a shuttle register and a shuttle counter, the shuttle counter counts a number of valid data bytes stored in the shuttle register, and the conversion logic uses the same shuttle register and the same shuttle counter for both conversion from the second format to the first format and conversion from the first format to the second format, wherein the conversion logic is hardware.

2. The storage controller of claim 1, wherein the first format includes symbol oriented data.

3. The storage controller of claim 1, wherein the second format includes byte oriented data.

4. The storage controller of claim 1, wherein at least one of the shuttle register and the shuttle counter concatenate the data based on first and second format requirements.

5. The storage controller of claim 1, wherein the first format is based on 10-bit symbol data and the second format is based on 8-bit byte data.

6. The storage controller of claim 4, further comprising a first register that receives the data from the disk drive before the shuttle register receives the data from the disk drive.

7. The storage controller of claim 4, further comprising a second register that stores the data after the data is converted.

8. The storage controller of claim 1, further comprising a first in first out ("FIFO") memory that stores the data.

9. The storage controller of claim 8, further comprising a counter that maintains a sector count in the FIFO memory.

10. The storage controller of claim 8, wherein when the data is written to the FIFO memory, the data is stored in the shuttle register and transferred to the FIFO memory based on a memory format.

11. A storage controller for interfacing between a host and a disk drive, the storage controller comprising:
buffer memory means for storing data that is transferred between the host and the disk drive; and
channel means located on the storage controller for receiving the data from the disk drive in one of a first format and a second format, and for determining whether data conversion is required based on whether the data is in the first format or the second format, wherein the channel means includes:
conversion logic means
for converting the data from the first format to the second format when the data conversion is required,
for storing the data in the buffer memory means in the second format, and for receiving the data from the buffer memory means in the second format, and
when the channel means receives the data from the buffer memory means in the second format, for selectively converting the data from the second format to the first format and transferring the data to the disk drive in the first format,
wherein the conversion logic means includes shuttle register means and shuttle counter means, the shuttle counter means counts a number of valid data bytes stored in the shuttle register means, and the conversion logic means uses the same shuttle register means and the same shuttle counter means for both conversion from the second format to the first format and conversion from the first format to the second format, wherein the conversion logic is hardware.

12. The storage controller of claim 11, wherein the first format includes symbol oriented data.

13. The storage controller of claim 11, wherein the second format includes byte oriented data.

14. The storage controller of claim 11, wherein at least one of the shuttle register means and the shuttle counter means is for concatenating the data based on first and second format requirements.

15. The storage controller of claim 11, wherein the first format is based on 10-bit symbol data and the second format is based on 8-bit byte data.

16. The storage controller of claim 14, further comprising first register means for receiving the data from the disk drive before the shuttle register means receives the data from the disk drive.

17. The storage controller of claim 14, further comprising second register means for storing the data after the data is converted.

18. The storage controller of claim 11, further comprising first in first out ("FIFO") memory means for storing the data.

19. The storage controller of claim 18, further comprising counter means for maintaining a sector count in the FIFO memory means.

20. The storage controller of claim 18, wherein when the data is written to the FIFO memory means, the data is stored in the shuttle register means and transferred to the FIFO memory means based on a memory format.

* * * * *